US006898674B2

(12) United States Patent
Maiyuran et al.

(10) Patent No.: US 6,898,674 B2
(45) Date of Patent: May 24, 2005

(54) APPARATUS, METHOD, AND SYSTEM FOR SYNCHRONIZING INFORMATION PREFETCH BETWEEN PROCESSORS AND MEMORY CONTROLLERS

(75) Inventors: Subramaniam Maiyuran, Gold River, CA (US); David McDonnell, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 10/170,171

(22) Filed: Jun. 11, 2002

(65) Prior Publication Data

US 2003/0229762 A1 Dec. 11, 2003

(51) Int. Cl.[7] ............................................. G06F 12/00
(52) U.S. Cl. ...................................... 711/137; 712/207
(58) Field of Search ............................... 712/205–206, 712/239; 711/137, 128; 707/207

(56) References Cited

U.S. PATENT DOCUMENTS

| | | | | |
|---|---|---|---|---|
| 6,178,498 B1 | * | 1/2001 | Sharangpani et al. | 712/239 |
| 6,240,488 B1 | * | 5/2001 | Mowry | 711/128 |
| 6,438,656 B1 | * | 8/2002 | Arimilli et al. | 711/137 |
| 2002/0010838 A1 | * | 1/2002 | Mowry | 711/128 |

OTHER PUBLICATIONS

Compiler and Run–time Hints for memory management, IBM Technical Disclosure Bulletin, vol. No. 32, pp. 76–77.*

* cited by examiner

*Primary Examiner*—Nasser Moazzami
(74) *Attorney, Agent, or Firm*—Blakely, Sokoloff, Taylor & Zafman LLP (57) ABSTRACT

According to one embodiment of the invention, a prefetcher in a memory controller is described which includes logic to receive memory request hints from a CPU. The memory request hints are used by the prefetcher in the memory controller to prefetch information from one or more memory devices coupled to the memory controller via a memory bus. The prefetcher in the memory controller further includes logic to determine the types of memory request hints provided by the CPU, the types of memory request hints are used to indicate whether the hints provided by the CPU are for instruction memory read request or data memory read request. The prefetcher in the memory controller also includes logic to generate prefetch requests to prefetch information from the one or more memory devices, based on the types of memory request hints provided by the CPU and bandwidth availability of the memory bus.

26 Claims, 6 Drawing Sheets

| TYPE OF HINT | PREFETCH FROM MAIN/SYSTEM MEMORY? | CPU ACTION | MEMORY CONTROLLER (MC) ACTION |
|---|---|---|---|
| CODE (INSTRUCTION) | PREFETCH | CPU INDICATES TO MC THAT THE REQUEST IS A CODE READ. THE DECODING FOR THIS REQUEST ALREADY EXISTS IN FSB. NO NEED FOR ADDITIONAL HINTS. | MC CAN INITIATE A NEXT LINE REQUEST. THE STORAGE OF THIS LINE CAN BE COMBINED WITH THE DATA OR CAN BE A DEDICATED BUFFER. |
| DATA-UNCACHEABLE READ | NO PREFETCH | MEMORY TYPE CAN BE DECODED FROM FSB | HINTS ALREADY EXIST |
| DATA-CACHEABLE READ | PREFETCH | IF STRIDE ANALYZER PREDICTS, THE PREDICTION INFORMATION GENERATED BY STRIDE ANALYZER CAN BE SENT TO MC. FOR EXAMPLE, -3, -2, -1, +1, +2, +3, ETC. | PARSE THE REQUEST TYPE AND STRIDE DISTANCE, AND INITIATE THE PREFETCH REQUEST TO MAIN MEMORY BASED ON THE HINT PROVIDED. IF NO HINT INFORMATION IS PROVIDED, MC CAN CHOOSE TO REQUEST THE NEXT LINE IF MEMORY BANDWIDTH IS AVAILABLE. |
| DATA-RFO | PREFETCH | SIMILAR TO DATA-CACHEABLE READ | SIMILAR TO DATA-CACHEABLE READ |
| DATA-STRING READS | NO PREFETCH | MOSTLY BANDWIDTH LIMITED. UCODE CAN INSERT PREFETCH INSTRUCTIONS. A HINT TO NOT PREFETCH IN THE MC. | NO NEED TO CACHE IT IN MC |

APPARATUS, METHOD, AND SYSTEM FOR SYNCHRONIZING INFORMATION PREFETCH BETWEEN PROCESSORS AND MEMORY CONTROLLERS

FIELD

An embodiment of the invention relates to processor and memory controller technologies, including data transfer technology between various components in computer systems, and more specifically, relates to an apparatus, method, and system for synchronizing information pre-fetch operations between processors and memory controllers.

BACKGROUND

As computer devices and systems continue to advance and become more complex, effective and efficient data transfer between the various components in computer systems have become more and more critical in system design and implementation. In particular, considerable effort and research has been focused on various mechanisms of information prefetching in computer systems to improve system performance. Prefetching is basically a technique used to hide memory latency in computer systems. For example, instructions and data can be prefetched from long-latency memory devices (e.g., main memory or external memory devices) to short-latency memory devices (e.g., cache memory devices that reside on the processors) so that instructions and data that are needed by execution units of the processors are readily available from the memory devices that are closer to the execution units. Therefore, prefetching can substantially reduce memory access time, which in turn improves the overall system performance. In general, hardware pre-fetching can be an effective technique to hide memory latency in various computing devices such as microprocessors (e.g., to improve performance of both integer and floating point applications). The advantages of having the pre-fetch hardware inside the processor include: (1) data can be brought closer the execution units (also called execution engine herein); (2) the pre-fetch predictor can obtain detailed information of a stride based on the linear address, instruction pointer, branching information, and the thread information; and (3) large cache arrays inside the processor are the cost-effective and logical place to store the pre-fetched data.

Recently, prefetching hardware has also been added to memory controllers in various chipset devices that are designed and implemented by Intel Corporation of Santa Clara, Calif. One of the advantages of having a prefetcher in a memory controller is that the memory controller can monitor the main memory bandwidth closely and utilize the unused memory bandwidth to prefetch information without significantly impacting the system performance. Alternatively, the memory controller can also throttle the prefetch traffic if memory bandwidth utilization for demand fetches is high. The prefetch logic or mechanism (also called prefetcher) in the memory controller has almost no visibility into the CPU where the actual execution of programs is taking place. As a result, the prefetch logic in the memory controller is not very effective with respect to the prediction of the next request address. For example, when the stride is not unit cacheline (i.e., the next cacheline), the prefetcher in the memory controller does not help in reducing memory access time. While the prefetcher of the memory controller does not hurt the performance of the system, it can have a negative impact with respect to power management of a power-conscious system. In addition, with increasing cacheline sizes in the processor, the next-line prefetching in the memory controller can become less effective.

BRIEF DESCRIPTION OF THE DRAWINGS

The invention may be best understood by referring to the following description and accompanying drawings that are used to illustrate embodiments of the invention, in which.

DETAILED DESCRIPTION

In the following detailed description numerous specific details are set forth. However, it is understood that embodiments of the invention may be practiced without these specific details.

In the discussion below, according to one embodiment of the invention, a method, apparatus, and system for synchronizing prefetch operations between a processor and a memory controller in a system is described. In one embodiment, the processor (also referred to as the central processing unit or CPU herein) includes a prefetcher (also called first prefetching logic or first prefetching mechanism herein) to prefetch information from long-latency memory devices (e.g., main memory or external memory) to shorter-latency memory devices (e.g., cache memory located in the CPU). The first prefetcher in the CPU is used to bring information closer to execution units (also called execution engine herein) so that such information will be readily available for use by the execution units without incurring long access time. In one embodiment, the memory controller also includes a prefetcher (also called second prefetching mechanism or second prefetching logic herein) configured to prefetch information from memory devices with long latency (e.g., main memory or external memory) to a storage device (e.g., buffer or cache memory located in the memory controller) inside the memory controller with shorter latency (e.g., faster access time) so that the information can be sent to the CPU with shorter access time when such information is needed by the CPU.

In one embodiment, the first pre-fetch mechanism in the CPU and the second pre-fetch mechanism in the memory controller cooperate to synchronize the pre-fetching of information, based at least in part, upon hints communicated to the first memory controller from the first CPU. In one embodiment, the CPU includes a first cache memory to store and dispatch pre-fetched information to one or more components in the CPU that need the information (e.g., the execution units). In one embodiment, the memory controller includes a buffer to store information pre-fetched from the main memory or external memory devices. The CPU further includes a stride analyzer to provide stride distance information to the memory controller via a pre-fetch request buffer that is located within the CPU.

The various embodiments of the invention are applicable to any apparatus, method, and system for information prefetching in processors and memory controllers. However, these embodiments are not limited to prefetching in processors and memory controllers and can be applied to prefetching of information in other devices and information processing systems.

Figure 1:
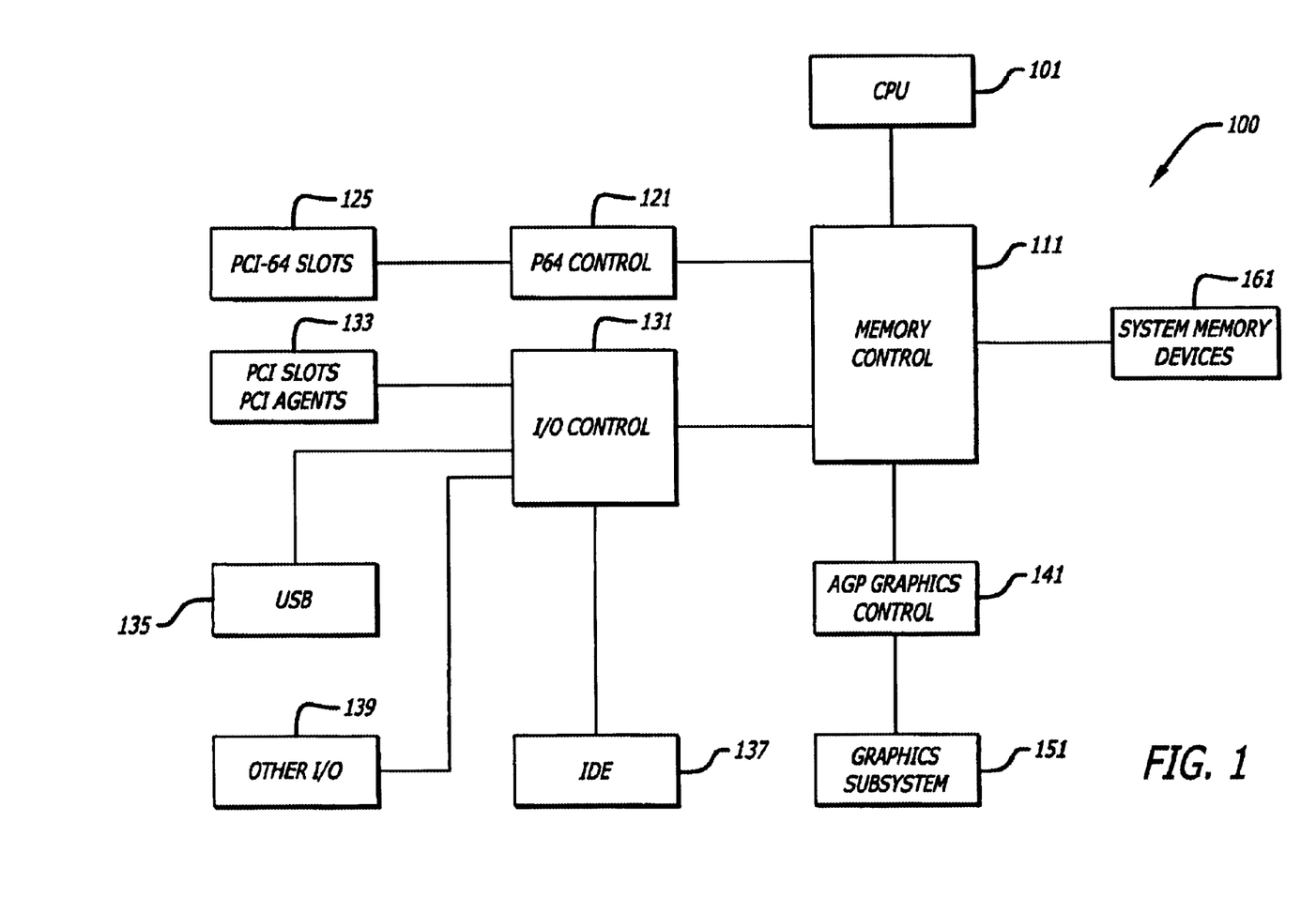
FIG. 1 is a block diagram of a system according to one embodiment of invention.

FIG. 1 shows a block diagram of a system configuration 100 according to one embodiment of the invention. The system configuration 100 includes one or more central processing units (CPU) 101, a memory control hub (also referred to as memory control unit or memory controller) 111, a P64 control unit 121, an Input/Output (IO) control unit 131, a graphics controller 141 coupled to a graphics subsystem 151, and a plurality of memory devices 161. For the purposes of the present specification, the term "processor" or "CPU" refers to any machine that is capable of executing a sequence of instructions and shall be taken to include, but not be limited to, general purpose microprocessors, special purpose microprocessors, multi-media controllers and microcontrollers, etc. In one embodiment, the CPU 101 is a general-purpose microprocessor that is capable of executing an Intel Architecture instruction set. The CPU 101, the P64 control unit 121, the IO control unit 131, and the AGP graphics control unit 141 access the system memory devices 161 via the memory control unit 111. The memory control unit 111, in one embodiment, is responsible for servicing all memory transactions that target the system memory devices 161. The memory control unit 111 can be a stand-alone unit, an integrated part of a chipset, or a part of some larger unit that control the interfaces between various system components and the system memory devices 161. The P64 control unit 121 provides the interface control between a plurality of PCI-64 slots 125 and the memory control unit 111. The IO control unit 131 provides the interface control between the memory unit 111 and various IO devices and ports including the PCI slots and PCI agents 133, a plurality of USB ports 135, a plurality of IDE ports 137, and other IO devices 139. The AGP graphics control unit 141 provides the interface control between the graphics subsystem 151 and the memory control unit 111. The structure and functions of the CPU 101 and the memory control unit 111 are described in greater details below.

Figure 2:
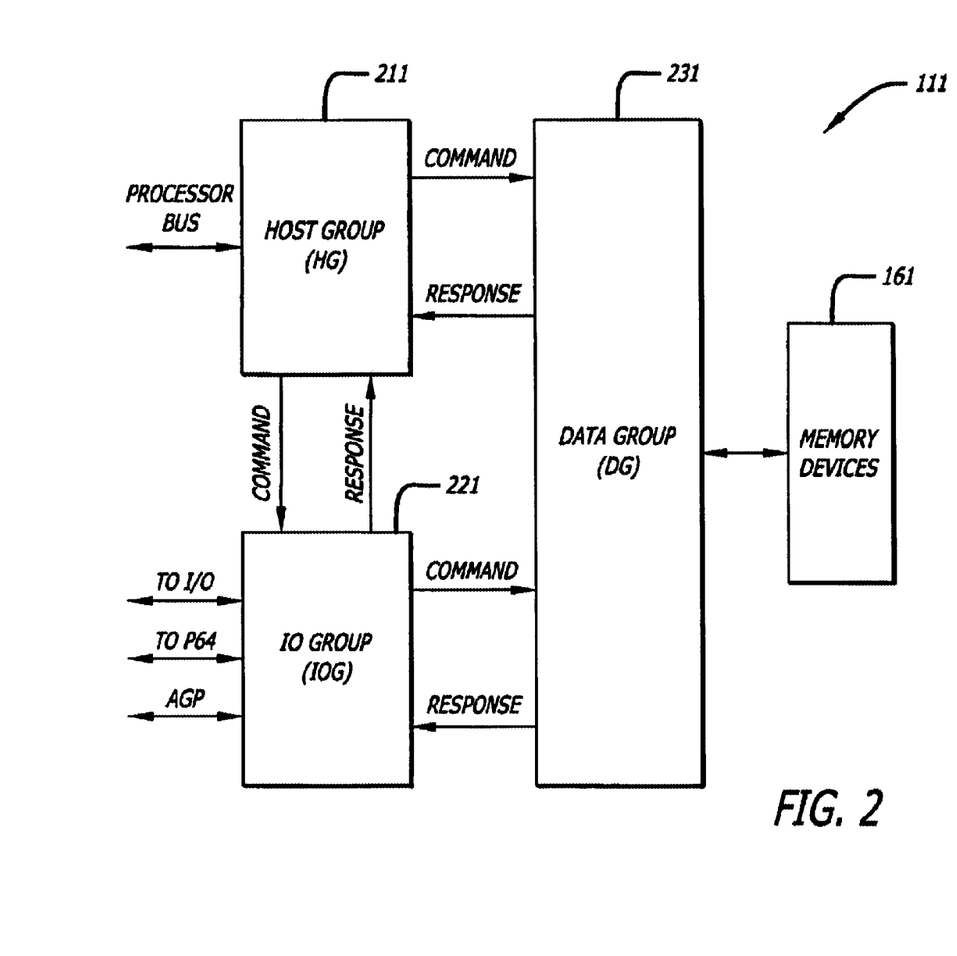
FIG. 2 shows a block diagram of a memory controller in accordance with one embodiment of the invention.

FIG. 2 shows a block diagram of one embodiment of the memory control unit 111 described in FIG. 1. In this embodiment, the memory control unit 111 contains three major blocks, the host group (HG) 211, the ID group (IOG) 221, and the data group (DG) 231.

In one embodiment, the host group 211 functions as a host interface for the memory control unit 111. Some of the functions performed by the host group 211 include receiving transaction requests from one or more CPUs 101, generating appropriate commands to both the IO group 221 and the data group 231, receiving responses from the IO group 221 and the data group 231, and transmitting the responses received to the host (CPU 101). In addition, the host group 211 is also responsible for generating snoop requests to the data group 231, receiving snoop responses from the data group 231, and transmitting snoop responses to the host.

The IO group 221, in one embodiment, functions as an IO interface for the memory control unit 111. More specifically, the IO group 221 handles the interface functions between the data group 231 and the P64 control unit 121, the IO control unit 131, and the graphics control unit 141.

In one embodiment, the data group (also referred to as data cluster) 231 is responsible for dispatching and completing all memory transactions that target the system memory devices (e.g., RDRAMs). In one embodiment, the data group 231 contains two logical subcomponents: a data unit (Dunit) that performs the intricate mechanics of sending transactions to the system memory devices and a buffer unit (Bunit) that is responsible for sequencing, buffering, and delivering data that are pulled from or pushed to the system memory devices across the memory bus. The Dunit accepts memory read, write, and refresh requests from the Bunit. These requests are decoded to determine the status of the memory pages to which they are targeted. The Dunit then generates the appropriate commands or instructions (also called the packets) necessary to carry out the memory access requests and queues up the packets for transmission across the memory bus. The Bunit, in one embodiment, receives requests for memory data from the host group 211 and the IO group 221 and generates the appropriate memory access requests to the Dunit as described above.

Figure 3:
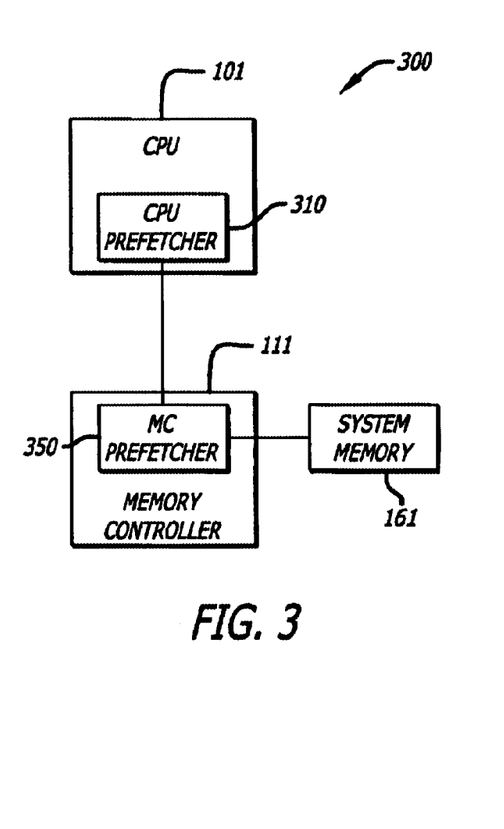
FIG. 3 illustrates a high level block diagram of a system to synchronize prefetch operations between a CPU and a memory controller, in accordance with one embodiment of the invention.

FIG. 3 shows a high level block diagram of a system 300 (e.g., system 100 described in FIG. 1) having a prefetcher 310 in a CPU (e.g., CPU 101 in FIG. 1) and a prefetcher 350 in a memory controller (e.g., memory controller 111 in FIG. 1). As shown in FIG. 3, in one embodiment, the prefetcher 310 in the CPU 101 operates to prefetch information (data/instruction) from memory devices with longer latency (e.g. system or main memory devices 161) to memory devices with shorter latency that are closer to the execution unit (e.g., cache memory located in the CPU). In one embodiment, the prefetcher 350 operates to prefetch information (data/instruction) from memory devices with longer latency (e.g., system or main memory 161) to memory devices with shorter latency located in the memory controller 111 (e.g., cache or buffer).

In one embodiment, the prefetcher 310 in the CPU 101 is configured to provide hints about the next request address to the prefetcher 350 in the memory controller so that the prefetcher 350 in the memory controller 111 can perform its prefetch operations more effectively and more efficiently based on the hints provided by the CPU 101. For example, based on the hints provided by the CPU 101, the prefetcher 350 can schedule prefetch accordingly to utilize the available memory bandwidth (e.g., the idle slots on the memory bus) for prefetching of information that more closely matching the needs of the CPU 101. Thus, in this embodiment, the CPU 101 and the memory controller 111 cooperate to achieve better efficiency and effectiveness in prefetching information. The cooperation and coordination between the CPU 101 and the memory controller 111 in prefetching information are described in more detail below.

Figure 4:
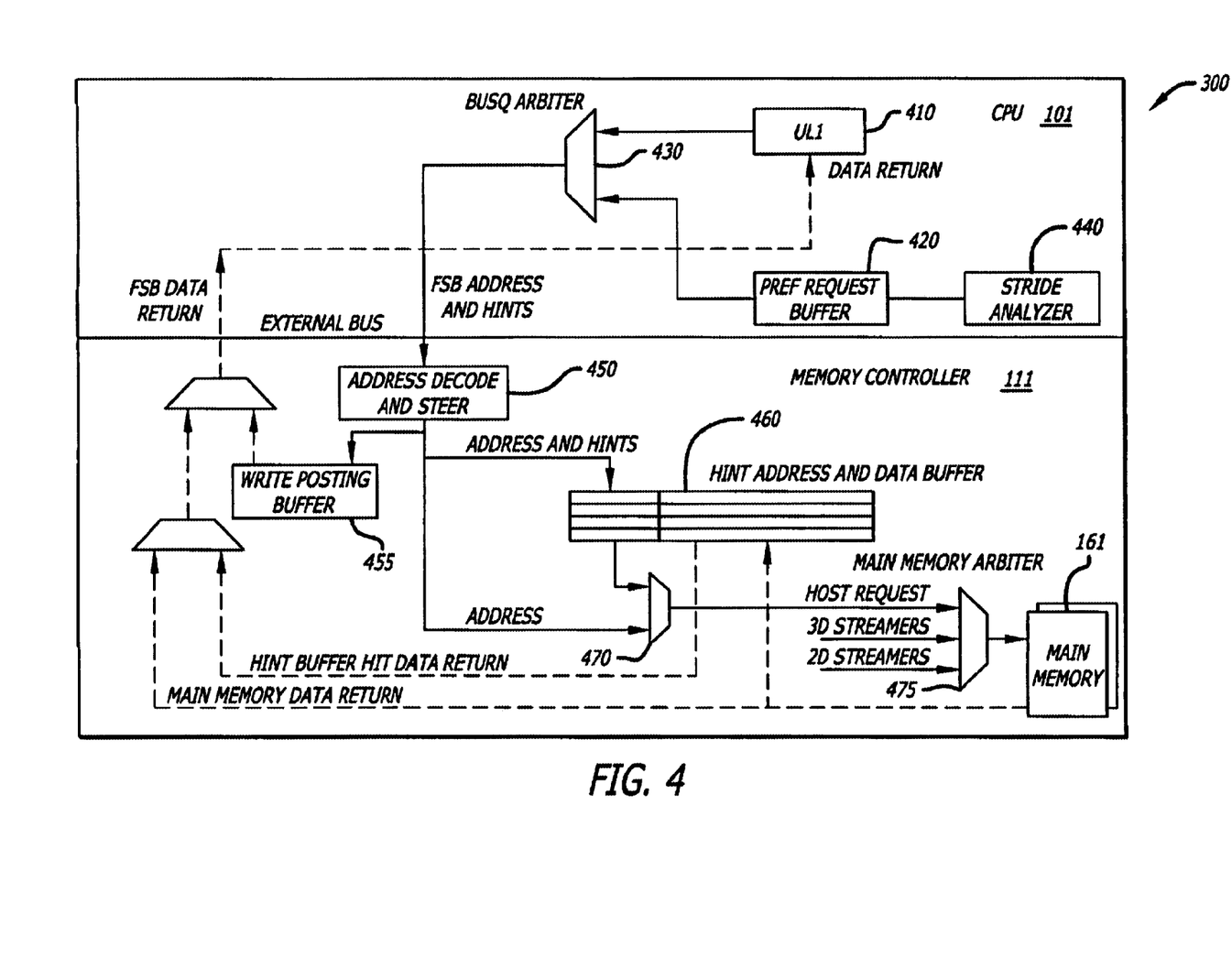
FIG. 4 illustrates a detailed block diagram of the system described in FIG. 3, according to one embodiment of the invention.

FIG. 4 illustrates a detailed block diagram of the system 300 according to one embodiment of the invention. As shown in FIG. 4, the CPU 101 includes a cache memory 410, a prefetch request buffer 420, a bus arbiter unit 430, and a stride analyzer 440. The cache memory 410, in one embodiment, is used to store data and instruction for use by the execution units (not shown) of the CPU 101. As shown in FIG. 4, the prefetch request buffer 420 is coupled to the stride analyzer to obtain stride information associated with the prefetch requests stored in the prefetch request buffer 420. The cache memory 410 and the prefetch request buffer 420 are coupled to the bus arbiter 430 to selectively provide memory request information to the memory controller 111 including memory request addresses and hints. The memory request addresses and hints provided by the CPU 101 are used by the memory controller 111 to identify prefetch candidates. Typically, during execution of a program, the execution units of the CPU 101 generate various types of memory requests (e.g., memory read requests to retrieve data or instructions) with corresponding addresses. If the requested data or instruction is found in the cache memory 410 (i.e., cache hit), the requested data or instruction is retrieved from the cache memory 410 to be sent to the execution units. If the requested data or instruction is not found in the cache memory (i.e., cache miss), the memory read request is sent to the memory controller for servicing. Generally, when there is a cache miss, the prefetcher of the CPU 101 also generates one or more prefetch requests to prefetch additional cache lines.

Referring again to FIG. 4, memory read requests that miss the cache memory 410 and prefetch requests are sent to the memory controller via the bus arbiter 430. As illustrated in FIG. 4, the memory controller 111 includes an address decoder and steer unit 450, a write posting buffer 455, a hint address and data buffer 460. The address decoder and steer unit 450 is coupled to receive memory request information from the cache memory 410 and the prefetch request buffer 420 via the bus arbiter 430. The address decode and steer unit 450 is also coupled to provide memory request information including memory addresses and hints to the write posting buffer 455 and the hint and address data buffer 460. In one embodiment, the memory request information provided by the CPU 101 including the addresses and hints are used by the prefetcher in the memory controller 111 to generate corresponding prefetch requests that more closely match the needs of the CPU 101 and available bandwidth on the memory bus. As shown in FIG. 4, the memory requests initiated by the CPU 101 and the prefetch requests initiated by the memory controller 111 are sent to the system or main memory devices 161 via the arbiter 470 and 475. Information returned from the main memory 161 based on the memory requests including prefetch requests generated by the CPU 101 is then sent to the cache memory 410. Information returned from the main memory 161 based on prefetch requests generated by the memory controller 111 is stored in the hint address and data buffer 460. In one embodiment, if a memory request generated by the CPU 101 hits the buffer 460, the requested information is retrieved from the buffer 460 and sent to the CPU 101. If the memory request generated by the CPU 101 misses the buffer 460, then the memory request is sent to the system or main memory 161 for servicing. As mentioned previously, the address and hint information provided by the CPU 101 is used by the memory controller 111 to generate prefetch requests that are more efficient and more effective with respect to the needs of the CPU 101 and the available bandwidth on the memory bus.

Figure 5:
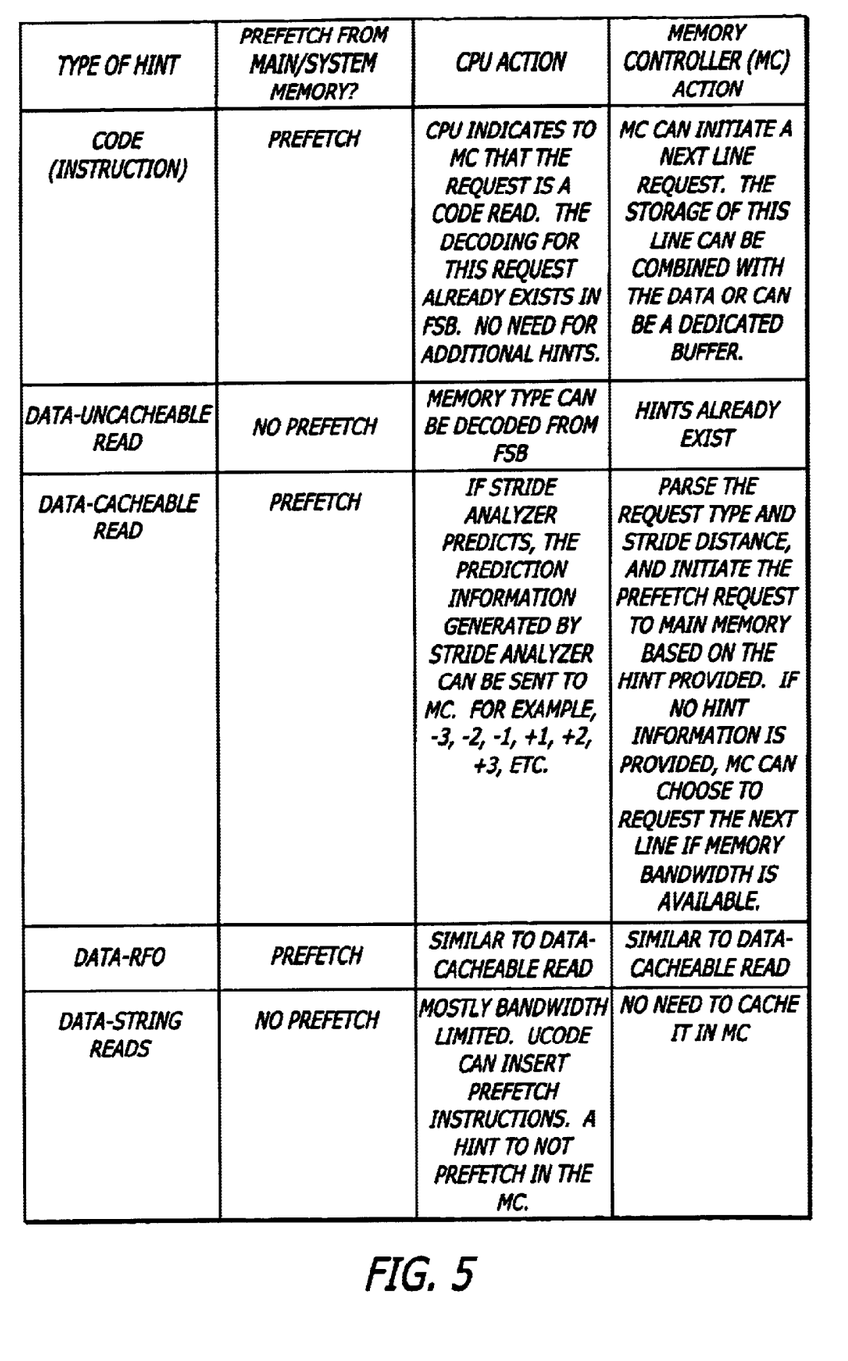
FIG. 5 shows a table illustrating the various hints that are provided by the CPU to the memory controller, in accordance with one embodiment of the invention.

FIG. 5 shows a table illustrating the various hints that are provided by the CPU 101 to the memory controller 111, in accordance with one embodiment of the invention. As described above, the hints provided by the CPU 101 can be used by the memory controller 111 to improve the effectiveness and efficiency of the prefetching operations performed by the memory controller 111. For example, as the CPU 101 can provide accurate hints about the next request address to the memory controller 111, the hints provided by the CPU 101 can be used by the memory controller 111 to prefetch information that are more accurately and closely match the needs of the CPU 101. The memory controller 111 can effectively and efficiently schedule these prefetch requests based on the available bandwidth on the memory bus because the memory controller can closely monitor the bandwidth of the memory bus and utilize the unused bandwidth to prefetch information without significant impact to the overall system performance.

As shown in FIG. 5, the appropriate actions taken by the CPU and the memory controller as they cooperate to improve the effectiveness of the memory controller prefetch operations depend on the type of hints provided. For example, the type of hint can be used to indicate whether the hint provided is for instruction (code) or for data. In addition, if the hint is for data, the type of hint can be used to determine whether the hint is for a cacheable read or uncacheable read, etc.

Figure 6:
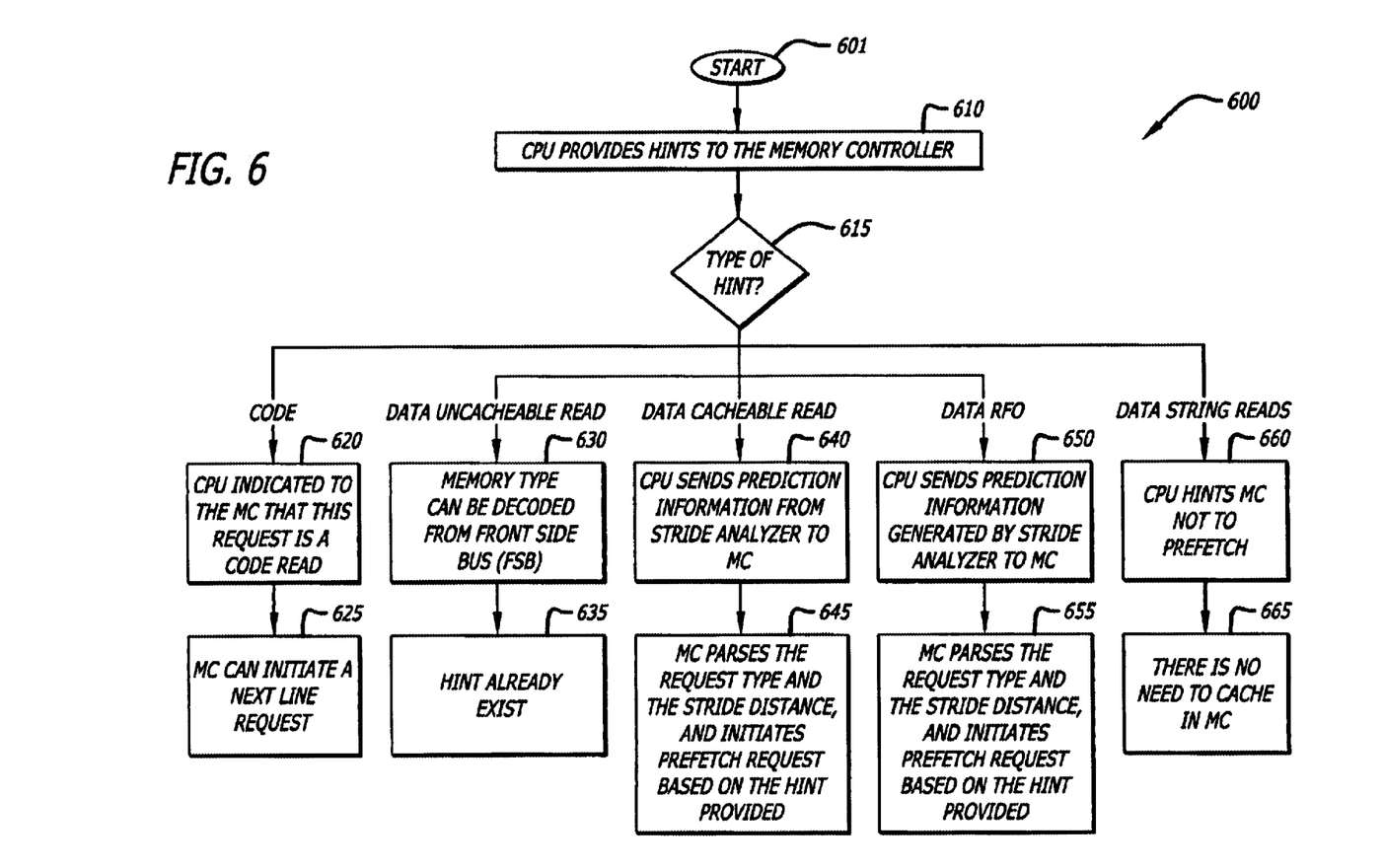
FIG. 6 shows a flow diagram of a process according to one embodiment of the invention.

FIG. 6 shows a flow diagram of a process 600 according to one embodiment of the invention. At block 610, the CPU provides memory request hints to the memory controller. At decision block 615, the process proceeds to either block 620, 630, 640, 650, or 660, depending on the type of hint provided by the CPU to the memory controller. The various actions taken by the CPU and the memory controller with respect to each type of hint are shown in FIG. 5 and illustrated again in FIG. 6. For example, as shown at block 620, if the type of hint provided is identified as a code (instruction) read, the CPU indicates to the memory controller that the corresponding memory request is a code read and that the decoding for this memory request already exists in the front side bus (FSB). In this case, there is no need for additional hint. In response to this type of hint provided by the CPU, the memory controller can initiate a next line prefetch request (block 625). In one embodiment, the code or instruction returned from the system or main memory can be combined with the data stored in a data buffer. Alternatively, the code or instruction returned can be stored in a dedicated buffer used for storage of code.

Continuing with the present discussion, if the type of hint provided by the CPU is for data uncacheable read, the CPU in this case indicates to the memory controller that the corresponding memory request type can be decoded from the FSB (block 630) and the memory controller knows that hint for this memory request already exists (block 635). In this case, there is no need for the memory controller to generate a prefetch request.

Referring to FIG. 6, if the type of hint is for data cacheable read, the CPU sends prediction information generated by the stride analyzer including stride distance to the memory controller (block 640). The memory controller then parses the memory request type and stride distance from the hint provided and initiates a prefetch request based on the hint (block 645). If no hint information is given by the CPU, then the memory controller may choose to request the next line if memory bandwidth is available. Similar actions can be taken by the CPU and the memory controller if the type of hint indicates a data read for ownership (RFO) (block 650 and block 655). If the type of hint provided indicates data string reads, this type of hint is used by the CPU to tell the memory controller not to prefetch in the memory controller (block 660) and the memory controller knows that there is no need to cache the hint in the memory controller.

Figure 7:
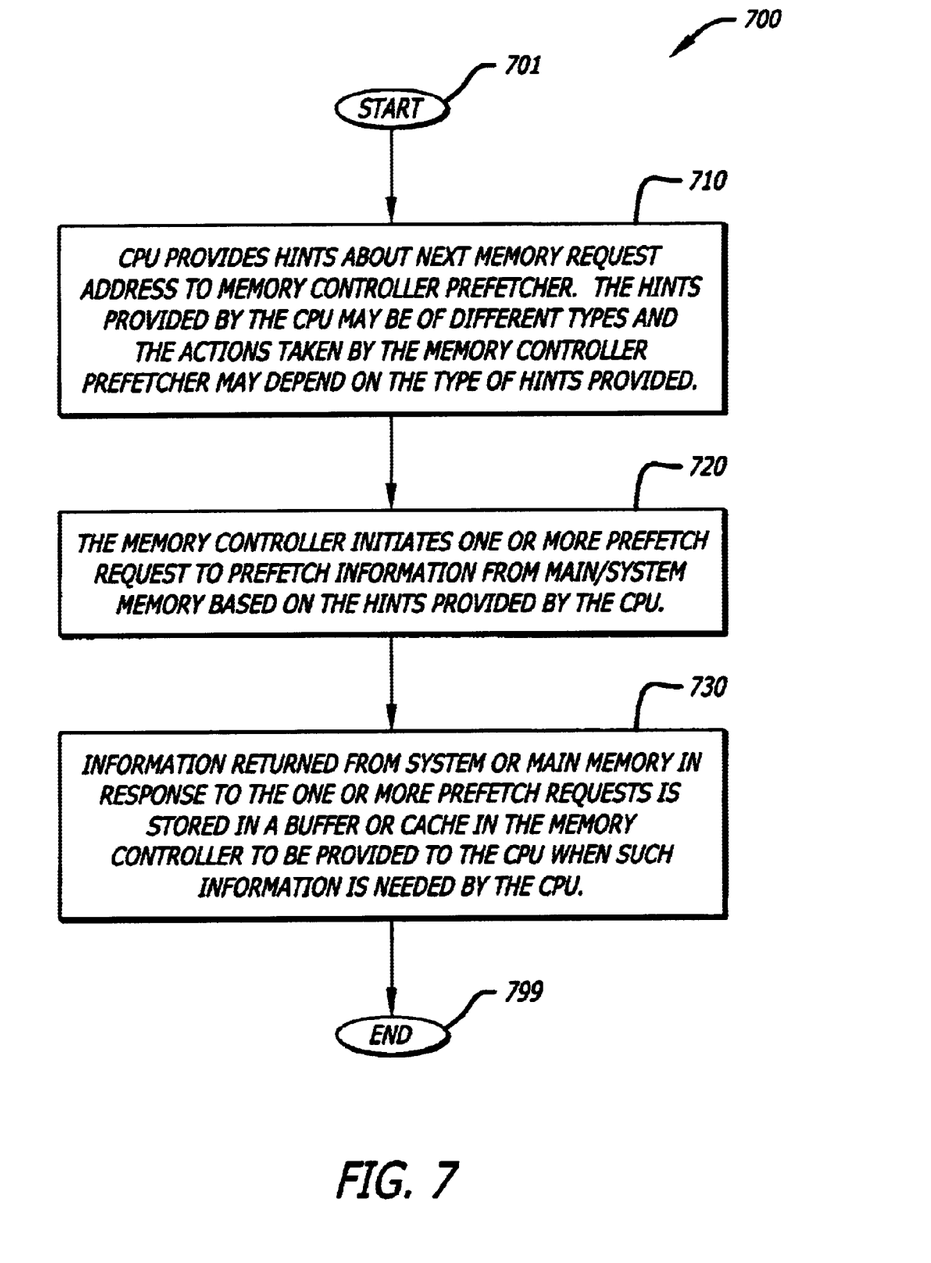
FIG. 7 shows a flow diagram of a method in accordance with one embodiment of the invention.

FIG. 7 shows a flow diagram of a method 700 in accordance with one embodiment of the invention. At block 710, a CPU provides hints about next memory request address to a memory controller prefetcher. As described above, the hints provided by the CPU may be of different types and the actions taken by the memory controller prefetcher may depend on the type of hints provided. At block 720, the memory controller initiates one or more prefetch requests based on the hints provided by the CPU.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A prefetcher in a memory controller, the prefetcher comprising:
   logic to receive one or more hints from a central processing unit (CPU) associated with a next requested address, the one or more hints being used by the prefetcher to prefetch information from one or more memory devices coupled to the memory controller via a memory bus;
   logic to determine types of hints provided by the CPU, the types of hints being used to at least indicate whether the one or more hints provided by the CPU are for an instruction memory read request or a data memory read request; and
   logic to generate prefetch requests to prefetch information from the one or more memory devices, based on the types of hints provided by the CPU and a bandwidth availability of the memory bus.

2. The prefetcher of claim 1 wherein,
   when the type of hint indicates that the respective hint of the one or more hints is for an instruction memory read request, the prefetcher initiates a next line prefetch request to prefetch the next instruction line from the one or more memory devices.

3. A prefetcher in a memory controller, the prefetcher comprising:
   logic to receive memory request hints from a central processing unit (CPU), the memory request hints being used by the prefetcher to prefetch information from one or more memory devices coupled to the memory controller via a memory bus;
   logic to determine the types of memory request hints provided by the CPU, the types of memory request hints being used to indicate whether the hints provided by the CPU are for instruction memory read request or data memory read request; and
   logic to generate prefetch requests to prefetch information from the one or more memory devices, based on the types of memory request hints provided by the CPU and bandwidth availability of the memory bus;
   wherein
   when the type of a memory request hint indicates that the respective memory request hint is for an instruction memory read request, the prefetcher initiates a next line prefetch request to prefetch a next instruction line from the one or more memory devices and the next instruction line returned from the one or more memory devices is combined and stored with prefetched data in the memory controller.

4. A prefetcher in a memory controller, the prefetcher comprising:
   logic to receive memory request hints from a central processing unit (CPU), the memory request hints being used by the prefetcher to prefetch information from one or more memory devices coupled to the memory controller via a memory bus;
   logic to determine the types of memory request hints provided by the CPU, the types of memory request hints being used to indicate whether the hints provided by the CPU are for instruction memory read request or data memory read request; and
   logic to generate prefetch requests to prefetch information from the one or more memory devices, based on the types of memory request hints provided by the CPU and bandwidth availability of the memory bus;
   wherein
   when the type of a memory request hint indicates that the respective memory request hint is for instruction memory read request, the prefetcher initiates a next line prefetch request to prefetch a next instruction line from the one or more memory devices and
   the instruction line returned from the one or more memory devices is stored in a buffer dedicated for storing prefetched instructions.

5. A prefetcher in a memory controller, the prefetcher comprising
   logic to receive memory request hints from a central processing unit (CPU), the memory request hints being used by the prefetcher to prefetch information from one or more memory devices coupled to the memory controller via a memory bus;
   logic to determine the types of memory request hints provided by the CPU, the types of memory request hints being used to indicate whether the hints provided by the CPU are for instruction memory read request or data memory read request;
   logic to generate prefetch requests to prefetch information from the one or more memory devices, based on the types of memory request hints provided by the CPU and bandwidth availability of the memory bus; and
   wherein when the type of a memory request hint indicates that the respective memory request hint is for data memory read request that is uncacheable, the prefetcher does not initiate a prefetch request upon receiving the respective memory request hint from the CPU.

6. A prefetcher in a memory controller, the prefetcher comprising:
   logic to receive memory request hints from a central processing unit (CPU), the memory request hints being used by the prefetcher to prefetch information from one or more memory devices coupled to the memory controller via a memory bus;
   logic to determine the types of memory request hints provided by the CPU, the types of memory request hints being used to indicate whether the hints provided by the CPU are for instruction memory read request or data memory read request;
   logic to generate prefetch requests to prefetch information from the one or more memory devices, based on the types of memory request hints provided by the CPU and bandwidth availability of the memory bus; and
   wherein when the type of a memory request hint indicates that the respective memory request hint is for data memory read request that is cacheable, the prefetcher parses the corresponding memory request type and the associated stride distance information and initiates a prefetch request based on the respective memory request hint information.

7. The prefetcher of claim 6 wherein,
   if no hint information is given, the prefetcher initiates a prefetch request to prefetch the next data line if there is available bandwidth on the memory bus.

8. A method comprising:
receiving one or more hints from a central processing unit (CPU) coupled to a memory controller, the one or more hints being associated with a next requested address, the one or more hints being used by a prefetcher in the memory controller to perform prefetch operations to prefetch information from one or more memory devices coupled to the memory controller via a memory bus;
determining a type of hint provided by the CPU, the type of hint being used to at least indicate whether the one or more hints provided by the CPU are for an instruction memory read request or a data memory read request; and
generating prefetch requests to prefetch information from the one or more memory devices, based, at least in part, on the type of hint provided by the CPU and a bandwidth availability of the memory bus.

9. The method of claim 8 wherein generating prefetch requests includes:
initiating a next line prefetch request to prefetch a next instruction line from the one or more memory devices, if the type of hint indicates that the respective hint is for an instruction memory read request.

10. The method of claim 9 further including:
storing the instruction line returned from the one or more memory devices in a storage device in the memory controller, the storage device to store prefetched data and prefetched instructions.

11. The method of claim 9 further including:
storing the instruction line returned from the one or more memory devices in a storage device, the storage device dedicated to store prefetched instructions.

12. A method comprising:
receiving memory request hints from a central processing unit (CPU) coupled to a memory controller, the memory request hints being used by a prefetcher in the memory controller to perform prefetch operations to prefetch information from one or more memory devices coupled to the memory controller via a memory bus;
determining types of memory request hints provided by the CPU, the types of memory request hints being used to at least indicate whether the hints provided by the CPU are for instruction memory read request or data memory read request;
generating prefetch requests to prefetch information from the one or more memory devices, based, at least in part, on the types of memory request hints provided by the CPU and a bandwidth availability of the memory bus; and
wherein if the type of memory request hint indicates that the respective memory request hint is for data memory read request that is cacheable, the generating prefetch requests includes:
parsing the corresponding memory request type and the associated stride distance information; and
initiating a prefetch request based on the respective memory request hint information.

13. The method of claim 12 wherein,
if no hint information is given, a prefetch request is initiated to prefetch the next data line based on available bandwidth on the memory bus.

14. A system comprising:
a central processing unit (CPU); and
a memory controller coupled to the CPU, the memory controller including a prefetcher to prefetch information from one or more memory devices for use by the CPU, the prefetcher including:
logic to receive one or more hints from the CPU respectively associated with one or more next requested addresses, the hints being used by the prefetcher in the memory controller to perform prefetch operations;
logic to determine a type of hint provided by the CPU, the type of hint being used to at least indicate whether the hints provided by the CPU are for an instruction memory read request or a data memory read request; and
logic to generate prefetch requests to prefetch information from the one or more memory devices, based, at least in part, on the type of hint provided by the CPU and a bandwidth availability of a memory bus connecting the memory controller with the one or more memory devices.

15. The system of claim 14 wherein,
when the type of a memory request hint indicates that the respective memory request hint is for instruction memory read request, the prefetcher initiates a next line prefetch request to prefetch the next instruction line from the one or more memory devices.

16. The system of claim 15 wherein the instruction line returned from the one or more memory devices is stored in a buffer dedicated for storing prefetched instructions.

17. A system comprising:
a central processing unit (CPU); and
a memory controller coupled to the CPU, the memory controller including a prefetcher to prefetch information from one or more memory devices for use by the CPU, the prefetcher including:
logic to receive memory request hints from the CPU respectively associated with one or more next requested addresses, the memory request hints being used by the prefetcher in the memory controller to perform its corresponding prefetch operations;
logic to determine a type of memory request hint provided by the CPU, the type of memory request hint being used to at least indicate whether the hints provided by the CPU are for an instruction memory read request or a data memory read request; and
logic to generate prefetch requests to prefetch information from the one or more memory devices, based, at least in part, on the type of memory request hints provided by the CPU and a bandwidth availability of a memory bus connecting the memory controller with the one or more memory devices; and
wherein when the type of memory request hint indicates that the respective memory request hint is for an instruction memory read request, the prefetcher initiates a next line prefetch request to prefetch the next instruction line from the one or more memory devices, and
the next instruction line returned from the one or more memory devices is combined and stored with prefetched data in the memory controller.

18. A system comprising:
a central processing unit (CPU); and
a memory controller coupled to the CPU, the memory controller including a prefetcher to prefetch information from one or more memory devices for use by the CPU, the prefetcher including:
logic to receive memory request hints from the CPU, the memory request hints being used by the prefetcher in the memory controller to perform its corresponding prefetch operations, logic to determine the type of memory request hints provided by the CPU, the type of memory request hints being used to indicate whether the hints provided by the CPU are for instruction memory read request or data memory read request, logic to generate prefetch requests to prefetch information from the one or more memory devices, based, at least in part, on the type of memory request hints provided by the CPU and bandwidth availability of a memory bus connecting the memory controller with the one or more memory devices, and wherein when the type of a memory request hint indicates that the respective memory request hint is for a data memory read request that is uncacheable, the prefetcher does not initiate a prefetch request upon receiving the respective memory request hint from the CPU.

19. A system comprising:

a central processing unit (CPU); and a memory controller coupled to the CPU, the memory controller including a prefetcher to prefetch information from one or more memory devices for use by the CPU, the prefetcher including:

logic to receive memory request hints from the CPU, the memory request hints being used by the prefetcher in the memory controller to perform its corresponding prefetch operations, logic to determine the type of memory request hints provided by the CPU, the type of memory request hints being used to indicate whether the hints provided by the CPU are for instruction memory read request or data memory read request, logic to generate prefetch requests to prefetch information from the one or more memory devices, based, at least in part, on the type of memory request hints provided by the CPU and bandwidth availability of a memory bus connecting the memory controller with the one or more memory devices, and wherein when the type of a memory request hint indicates that the respective memory request hint is for data memory read request that is cacheable, the prefetcher parses the corresponding memory request type and the associated stride distance information and initiates a prefetch request based on the respective memory request hint information.

20. The system of claim 19 wherein, if no hint information is given, the prefetcher initiates a prefetch request to prefetch a next data line if there is available bandwidth on the memory bus.

21. A system comprising:

a processor including:

a cache memory to store information for use by one or more execution units of the processor;

a prefetch request buffer to store prefetch requests initiated by the processor; and a stride analyzer to generate stride information associated with prefetch requests stored in the prefetch request buffer;

a memory controller coupled to the processor, the memory controller including:

a buffer to store memory request information received from the processor including one or more memory request addresses, and one or more hints;

and one or more memory devices coupled to the memory controller via a memory bus, wherein the memory controller performs prefetch operations based on the hints received from the processor and a bandwidth availability of the memory bus.

22. The system of claim 21 wherein the memory controller further including:

logic to determine the types of memory request hints received from the processor, the types of memory request hints being used to indicate whether the hints provided by the processor are for instruction memory read request or data memory read request.

23. The system of claim 22 wherein the memory controller further including:

logic to generate prefetch requests to prefetch information from the one or more memory devices based on the types of memory request hints and bandwidth availability of the memory bus.

24. The system of claim 23 wherein, when the type of hint indicates that the respective hint is for an instruction memory read request, the memory controller initiates a next line prefetch request to prefetch the next instruction line from the one or more memory devices.

25. A system comprising:

a processor including:

a cache memory to store information for use by one or more execution units of the processor, a prefetch request buffer to store prefetch requests initiated by the processor, and a stride analyzer to generate stride information associated with prefetch requests stored in the prefetch request buffer;

a memory controller coupled to the processor, the memory controller including:

logic to determine the types of memory request hints received from the processor, the types of memory request hints being used to indicate whether the hints provided by the processor are for instruction memory read request or data memory read request logic to generate prefetch requests to prefetch information from the one or more memory devices based on the types of memory request hints and bandwidth availability of the memory bus, and a buffer to store memory request information received from the processor, the buffer including one or more memory request addresses, and one or more hints;

and one or more memory devices coupled to the memory controller via a memory bus, wherein the memory controller performs prefetch operations based on the hints received from the processor and a bandwidth availability of the memory bus, and when the type of hint indicates that the respective hint is for a data memory read request that is uncacheable, the memory controller does not initiate a prefetch request upon receiving the respective hint from the processor.

26. A system comprising:

a processor including:

a cache memory to store information for use by one or more execution units of the processor, a prefetch request buffer to store prefetch requests initiated by the processor, and a stride analyzer to generate stride information associated with prefetch requests stored in the prefetch request buffer;

a memory controller coupled to the processor, the memory controller including:
- logic to determine the types of memory request hints received from the processor, the types of memory request hints being used to indicate whether the hints provided by the processor are for instruction memory read request or data memory read request
- logic to generate prefetch requests to prefetch information from the one or more memory devices based on the types of memory request hints and bandwidth availability of the memory bus, and
- a buffer to store memory request information received from the processor, the buffer including one or more memory request addresses, and
- one or more hints;

and one or more memory devices coupled to the memory controller via a memory bus, wherein the memory controller performs prefetch operations based on the hints received from the processor and a bandwidth availability of the memory bus, and when the type of a hint indicates that the respective hint is for a data memory read request that is cacheable, the memory controller parses the corresponding type and the associated stride distance information and initiates a prefetch request based on the respective hint information.

\* \* \* \* \*